J. F. O'CONNOR.
COMBINED CAR CENTER PLATE AND TRUCK ALINING DEVICE.
APPLICATION FILED AUG. 20, 1917.
1,304,086.
Patented May 20, 1919.
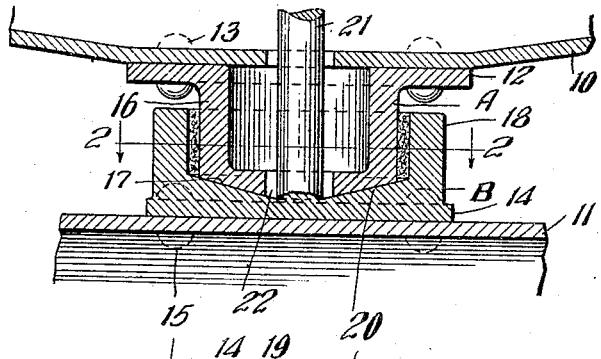
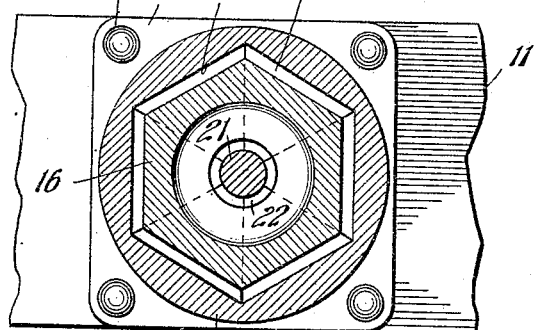
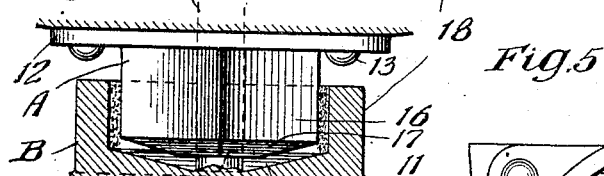
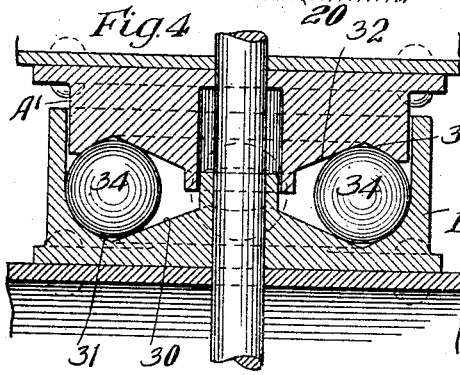
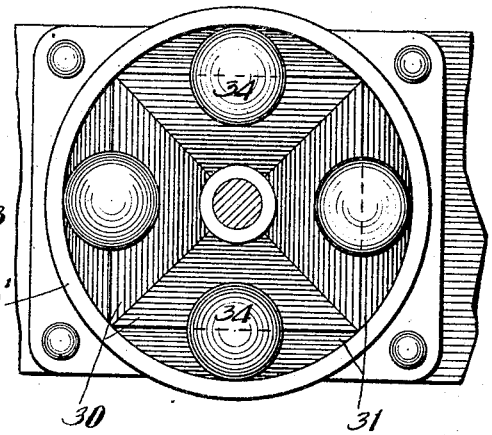
WITNESSES:
Wm. Geiger
INVENTOR.
John F. O'Connor
BY Geo. J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

COMBINED CAR CENTER-PLATE AND TRUCK-ALINING DEVICE.

1,304,086.

Specification of Letters Patent.

Patented May 20, 1919.

Application filed August 20, 1917. Serial No. 187,290.

*To all whom it may concern:*

Be it known that I, JOHN F. O'CONNOR, a citizen of the United States, residing at Chicago, in the county of Cook and State of Illinois, have invented a certain new and useful Improvement in Combined Car Center-Plates and Truck-Alining Devices, of which the following is a full, clear, concise, and exact description, reference being had to the accompanying drawings forming a part of this specification.

This invention relates to improvements in combined car center plates and truck alining devices.

As is well known, in the operation of railway cars, the flanges of the wheels wear very rapidly which is due to the fact that, when the cars leave a curved section of track and enter the tangent or straight portion, the trucks having been previously turned or twisted with respect to the car body, tend to remain in such twisted or turned position. The result is that the wheels remaining constantly at an angle to the tracks, the flanges of the wheels are constantly bearing against the rails at an angle with consequent rapid wear. Due to the comparatively great friction between the trucks and the car body, there is nothing to compel the return of the trucks to proper position, that is, in alinement with the car bodies, in present day construction. To overcome this difficulty, elaborate attempts have been made to minimize the friction between the center bearing plates which are interposed between the body and truck bolsters of the car, but this has not eliminated the excessive wear of the wheel flanges.

The object of my invention is to provide a simple and efficient arrangement for automatically and positively alining the car trucks with the car body after the car leaves a curved portion of track and enters the tangent or straightaway portion and to automatically maintain the truck in this position while at the same time permitting the necessary free movements of the trucks with respect to the cars when the cars enter a curved section of track.

More specifically, the object of the invention is to provide a center plate construction wherein the upper and lower members of the center plate have opposed inclined faces so arranged that, when the truck is properly alined with respect to the car body, the body and truck bolsters are in their closest position but, as the truck is swiveled with respect to the car body, the bolsters are automatically separated vertically and the weight of the car body is then utilized to automatically force the truck into proper alinement with the car body when the car enters the tangent or straight portion of the track.

In the drawing forming a part of this specification, Figure 1 is a vertical, sectional view through the center pin of portions of body and truck bolsters of a car showing my improvements in connection therewith. Fig. 2 is a horizontal, sectional view, taken on the line 2—2 of Fig. 1. Fig. 3 is a view corresponding to Fig. 1 but illustrating the relative position of the parts while the truck is turned with respect to the car body. Fig. 4 is a view corresponding to Fig. 1 illustrating another embodiment of the invention. Fig. 5 is a top plan view of the structure shown in Fig. 4 with the body bolster and attached center plate removed.

Referring to the construction illustrated in Figs. 1, 2 and 3, 10 denotes the under portion of a body bolster and 11 the upper portion of an opposed truck bolster. My improved device, as shown, comprises an upper center bearing member A and a lower center bearing member B.

Said member A is provided at its upper end with an outstanding flange 12 by which it is adapted to be riveted to the body bolster, as indicated by the rivets 13. The lower member B is also provided with a suitable flange 14 at its lower portion by which it is adapted to be riveted to the truck bolster 11, as indicated by the rivets 15. The member A includes a depending portion 16 which is of hexagonal cross-section, as clearly indicated in Fig. 2, and at the bottom is of pyramidal form having six inclined faces 17—17. The center plate member B is provided with an upstanding circular flange 18 so formed on its inner face as to provide six faces 19—19 arranged in the manner of a hexagon of larger area than the cross-sectional area of the portion 16. At the bottom of the recess in the member B, six inclined faces 20—20 are provided disposed as most clearly illustrated in Figs. 1 and 2. A center pin 21 may be formed integrally with the member B, the same extending through a suitable perforation 22 in the member A.

The normal position of the parts is as illustrated in Figs. 1 and 2, that is, with the bearing faces 17 of the member A in full surface contact with the inclined bearing faces 20 of the member B. When the car truck is turned or swiveled with respect to the car body, it is obvious that the inclined faces 17 of the member A will ride upon the inclined bearing faces 20 of the member B so that the two center plate members A and B will be forced apart slightly and the car body elevated with respect to the car truck. This condition is illustrated in Fig. 3. As will be obvious, the clearance between the sides of the members A and B will be such as to permit the necessary relative angular movements therebetween. After the bolsters have been separated in the manner above described and the car enters a tangent or straight portion of track the weight of the car body acting through the inclined faces on the lower part of the member A will automatically tend to force the truck back to its normal position in alinement with the car and in accomplishing this result, I take into account the fact that there is constant jarring and vibration of the parts while the car is running which will assist in the action above described.

In the construction illustrated in Figs. 4 and 5, the truck center plate member B' is provided with four inclined surfaces 30—30 arranged in the form of a pyramid and each of said surfaces 30 has a complemental oppositely inclined surface 31—31 so that four V-shaped grooves are provided as best illustrated in Fig. 4. The under surfaces of the body bolster center plate member A' is correspondingly formed with four sets of inclined surfaces 32 and 33, each set of which forms an inverted groove opposite the groove formed in the lower center bearing member. In this construction, anti-friction balls 34 are employed, each of which is located between a set of inclined faces comprising one of each of the faces 30, 31, 32 and 33.

The normal position of the parts is shown in Fig. 4, that is, with the truck in alinement with the car body. As the truck is turned with respect to the car body, it is apparent that the anti-friction balls will be elevated and compelled to travel up the inclined faces 30 and 31 of the lower member B' and similarly with respect to the surfaces 32 and 33 of the upper member A'. This causes the separation of the center plate members A' and B' and consequently of the bolsters so that, when the car leaves a curved section of track and enters the tangent, the weight of the car will automatically return the truck to proper position in the same manner as heretofore described in connection with the construction illustrated in Figs. 1, 2 and 3.

Although I have herein shown and described what I now consider the preferred manner of carrying out my invention, the same is merely illustrative and I contemplate all changes and modifications that come within the scope of the claims appended hereto.

I claim:

1. In car construction, the combination with body and truck bolsters, of a center bearing plate movable in unison with the body bolster, a center bearing plate movable in unison with the truck bolster, said center bearing plates being provided with opposed sets of faces, each set comprising a plurality of faces radiating from the center of the bearing plate and disposed at an angle to the horizontal, the arrangement of said faces being such that when the two bolsters are parallel, the faces are nearest each other, and as the bolsters are moved angularly relatively to each other, the faces compel vertical separation of the bearing plates and the weight of the car body will automatically return the truck to normal position when the car enters a straight section of track.

2. In car construction, the combination with the body and truck bolsters, of upper and lower center bearing plates secured respectively to the body and truck bolsters, one of said center bearing plates having a substantially pyramidal shaped section opposed to the other bearing plate, said other bearing plate having a complemental surface coöperable with the pyramidal-shaped section of the first named center bearing plate.

In witness that I claim the foregoing I have hereunto subscribed my name this 4th day of Aug., 1917.

JOHN F. O'CONNOR.